US 12,034,774 B2

(12) United States Patent
Inman, II et al.

(10) Patent No.: US 12,034,774 B2
(45) Date of Patent: Jul. 9, 2024

(54) METHOD AND APPARATUS FOR CONTROLLING COMPUTING ASSETS WITHIN A ZERO-TRUST ARCHITECTURE

(71) Applicant: The Boeing Company, Chicago, IL (US)

(72) Inventors: William S. Inman, II, Johns Island, SC (US); Mark J. Boyer, Placentia, CA (US)

(73) Assignee: The Boeing Company, Chicago, IL (US)

( * ) Notice: Subject to any disclaimer, the term of this patent is extended or adjusted under 35 U.S.C. 154(b) by 46 days.

(21) Appl. No.: 17/889,858

(22) Filed: Aug. 17, 2022

(65) Prior Publication Data
US 2024/0064180 A1    Feb. 22, 2024

(51) Int. Cl.
*H04L 9/40* (2022.01)

(52) U.S. Cl.
CPC ........ *H04L 63/205* (2013.01); *H04L 63/0209* (2013.01); *H04L 63/0236* (2013.01); *H04L 63/0807* (2013.01); *H04L 63/0823* (2013.01); *H04L 63/105* (2013.01)

(58) Field of Classification Search
CPC ............... H04L 63/205; H04L 63/0209; H04L 63/0236
See application file for complete search history.

(56) References Cited

U.S. PATENT DOCUMENTS

| | | | |
|---|---|---|---|
| 7,197,546 B1* | 3/2007 | Bagga | H04L 41/5077 709/219 |
| 2009/0092047 A1* | 4/2009 | Gemelos | H04L 43/091 370/235 |
| 2018/0288198 A1* | 10/2018 | Pope | H04L 43/18 |
| 2020/0159603 A1* | 5/2020 | Panda | H04L 43/0817 |
| 2021/0266346 A1* | 8/2021 | Gordon | H04L 63/0245 |
| 2022/0060498 A1* | 2/2022 | Head, Jr. | H04L 12/4641 |
| 2022/0109685 A1* | 4/2022 | Hankins | H04L 63/0227 |
| 2024/0064203 A1* | 2/2024 | Chang | H04L 67/1097 |

FOREIGN PATENT DOCUMENTS

CN    114116638 A    3/2022

* cited by examiner

*Primary Examiner* — William S Powers
(74) *Attorney, Agent, or Firm* — Quinn IP Law (57) ABSTRACT

A method and apparatus are disclosed for controlling access of a computing device to a multi-layer network implementing a zero-trust architecture, the multi-layer network including a switch and apparatus for controlling access to a plurality of hierarchical levels of the multi-layer network. The method includes receiving, at the apparatus, an access request message from the computing device, the access request message including one or more identifiers associated with the computing device for requesting access to the multi-layer network. The method further includes determining a hierarchical penetration level among the plurality of hierarchical levels of the multi-layer network to be assigned to the computing device based on the one or more identifiers within the access request message. The method further includes assigning the hierarchical penetration level to the computing device, and granting the computing device access and control privileges to the multi-layer network, based on the assigned hierarchical penetration level.

24 Claims, 7 Drawing Sheets

METHOD AND APPARATUS FOR CONTROLLING COMPUTING ASSETS WITHIN A ZERO-TRUST ARCHITECTURE

BACKGROUND

Field of the Disclosure

The present disclosure relates to computer networks. More particularly, the present disclosure relates to multi-layer networks implementing a zero-trust architecture.

Description of Related Art

The proliferation of wireless devices, including Internet of Things (IoT) devices, company wireless equipment, and smart phones, has led to a substantial need for an improvement in network security. One such improvement in network security has been the move away from implicit trust architectures, where network security is designed to implicitly trust new devices and authenticate them after joining the network, to zero-trust architectures, where networks, by default, do not trust new devices and every digital interaction between the new device and the zero-trust network must be authenticated. Some considerations in building and designing these networks include safely enabling and facilitating network integration of non-authenticated and non-standard devices, including mobile devices, in a reasonable timeframe to allow authorized users to join the network.

There is therefore a need for methods and devices to address at least some of these issues.

BRIEF SUMMARY

Example implementations of the present disclosure are directed to a method and apparatus for controlling access of a computing device to a multi-layer network implementing a zero-trust architecture. The presently disclosed method includes receiving communication messages, including access request messages, from a computing device (e.g., mobile device) requesting access to the multi-layer network. The access request messages from the computing device are received by a switch and analyzed by a device in communication with the switch or a device collocated with the switch. Based on the contents in the access request message, and other parameters of the computing device, a hierarchical penetration level is assigned to the computing device indicating what hierarchical level of the multi-layer network the computing device is allowed to access.

For example, assume a hypothetical multi-layer network where payroll servers are within a third hierarchical level, web servers are within a second hierarchical level, and a DNS server is within a first hierarchical level, where the third hierarchical level is of higher security than the second and first hierarchical levels, and the second hierarchical level is of higher security than the first hierarchical level. Based on the contents of the access request message from the computing device, as well as other parameters associated with the computing device, the computing device is granted access to one or more of the hierarchical levels in the multi-layer network. The computing device is assigned the first hierarchical penetration level and that will only grant it access to the DNS server and no other device. On the other hand, the computing device is assigned the third hierarchical penetration level and it will have access to the payroll servers, web servers, and/or the DNS server, based on the design of the network. However, due to the nature of the zero-trust architecture of the multi-layer network, the computing device is denied any access to the network beyond the switch it connects to until the computing device is assigned a hierarchical penetration level.

The present disclosure thus includes, without limitation, the following example implementations.

Some example implementations provide a method for controlling access of a computing device to a multi-layer network implementing a zero-trust architecture, the multi-layer network comprising a switch and an apparatus for controlling access to a plurality of hierarchical levels of the multi-layer network, the method comprising: receiving, by the apparatus, an access request message at the multi-layer network from the computing device, the access request message including one or more identifiers associated with the computing device for requesting access to the multi-layer network; determining, by the apparatus, a hierarchical penetration level among the plurality of hierarchical levels of the multi-layer network to be assigned to the computing device based on the one or more identifiers within the access request message, wherein determining the hierarchical penetration level to be assigned includes: comparing, by the apparatus, the one or more identifiers of the access request message to a list of known identifiers and corresponding known hierarchical penetration levels associated with the known identifiers, the list stored in a database; and determining, by the apparatus, if the one or more identifiers of the access request message matches with any of the known identifiers in the list; assigning, by the apparatus to the computing device, the corresponding known hierarchical penetration level as the hierarchical penetration level of the computing device if the one or more identifiers of the access request message matches with any of the known identifiers in the list, or assigning a default hierarchical penetration level as the hierarchical penetration level of the computing device if the one or more identifiers does not match with any of the known identifiers in the list; and granting, by the multi-layer network, the computing device access and control privileges for the multi-layer network, the access and control privileges permitting access up to a permitted level of the hierarchical levels of the multi-layer network that corresponds to the hierarchical penetration level assigned to the computing device.

In some example implementations of the method of any preceding example implementation, or any combination thereof, the hierarchical penetration level is a highest available hierarchical penetration level of the hierarchical levels in the multi-layer network for the computing device based on the one or more identifiers, and wherein the one or more identifiers comprise at least a MAC address associated with the computing device.

In some example implementations of the method of any preceding example implementation, or any combination thereof, determining the highest available hierarchical penetration level for the computing device includes determining that the computing device should be assigned to a first hierarchical penetration level, corresponding to a lowest hierarchical level of the multi-layer network, based on an analysis of the MAC address, a communication protocol used by the computing device, and an authentication criterion associated with the computing device.

In some example implementations of the method of any preceding example implementation, or any combination thereof, the method further comprises assigning, by the apparatus, the first hierarchical penetration level to the computing device, and thereby permitting the computing device access and control privileges to an isolated network access and control zone separate from and non-communicative with the rest of the multi-layer network.

In some example implementations of the method of any preceding example implementation, or any combination thereof, determining the highest available hierarchical penetration level for the computing device includes determining that the computing device should be assigned to a second hierarchical penetration level, corresponding to a second lowest hierarchical level of the multi-layer network, based on an analysis of the MAC address, the analysis of the MAC address including a first confirmation that the MAC address is in a computer inventory management database associated with an authentication management device of the multi-layer network, and wherein the authentication management device is in communication with the switch and configured to dynamically update the computer inventory management database with allowed MAC addresses.

In some example implementations of the method of any preceding example implementation, or any combination thereof, the method further comprises: assigning, by the apparatus, the second hierarchical penetration level to the computing device, and thereby permitting the computing device access to an isolated network access and control zone isolated from the rest of the multi-layer network except for other devices in the isolated network access and control zone; and permitting the computing device to communicate with other computing devices within the isolated network access and control zone which have also been assigned to the second hierarchical penetration level.

In some example implementations of the method of any preceding example implementation, or any combination thereof, determining the highest available hierarchical penetration level for the computing device includes determining that the computing device should be assigned to a third hierarchical penetration level, corresponding to a third lowest hierarchical level of the multi-layer network, based on an establishment of communication between the computing device and a proxy server.

In some example implementations of the method of any preceding example implementation, or any combination thereof, the method further comprises: assigning, by the apparatus, the third hierarchical penetration level to the computing device, and thereby permitting the computing device access to an isolated network access and control zone isolated from the rest of the multi-layer network except for other devices in the isolated network access and control zone; and permitting the computing device to communicate with: other computing devices within the isolated network access and control zone which have also been assigned to the third hierarchical penetration level; and a defined external endpoint that is external to the isolated network access and control zone.

In some example implementations of the method of any preceding example implementation, or any combination thereof, determining the highest available hierarchical penetration level for the computing device includes determining that the computing device should be assigned to a fourth hierarchical penetration level, corresponding to a second highest hierarchical level of the multi-layer network, based on an operating system component of the computing device that is accepting of a network authentication certificate or token.

In some example implementations of the method of any preceding example implementation, or any combination thereof, the method further comprises: assigning, by the apparatus. the fourth hierarchical penetration level to the computing device, and thereby permitting the computing device access to an isolated network access and control zone isolated from the rest of the multi-layer network except for other devices in the isolated network access and control zone; and permitting the computing device to communicate with: other computing devices within the isolated network access and control zone which have also been assigned to the fourth hierarchical penetration level; a defined external endpoint that is external to the isolated network access and control zone; and infrastructure application services in the multi-layer network and outside the isolated network access and control zone.

In some example implementations of the method of any preceding example implementation, or any combination thereof, determining the highest available hierarchical penetration level for the computing device includes determining that the computing device should be assigned to a fifth hierarchical penetration level, corresponding to a highest hierarchical level in the multi-layer network, based on a second confirmation that the MAC address of the computing device is in an internal database associated with an authentication management device of the multi-layer network, and wherein the authentication management device is in communication with the switch and configured to dynamically update the internal database with MAC addresses of other computing devices allowed into the multi-layer network.

In some example implementations of the method of any preceding example implementation, or any combination thereof, the method further comprises assigning, by the apparatus, the fifth hierarchical penetration level to the computing device and thereby permitting the computing device access to an isolated network access and control zone isolated from the rest of the multi-layer network except for other devices in the isolated network access and control zone; and permitting the computing device to communicate with: other computing devices which have also been assigned to the fifth hierarchical penetration level; a defined external endpoint that is external to the isolated network access and control zone; infrastructure application services in the multi-layer network and outside the isolated network access and control zone; and at least one of the other computing devices or services on the multi-layer network.

Some other example implementations provide an apparatus for controlling access of a computing device to a multi-layer network implementing a zero-trust architecture, the multi-layer network comprising a switch and the apparatus for controlling access to a plurality of hierarchical levels of the multi-layer network, the apparatus comprising a non-transitory memory having executable instructions stored therein, that when executed by one or more processors of the apparatus, cause the apparatus to: receive an access request message from the computing device, the access request message including one or more identifiers associated with the computing device for requesting access to the multi-layer network; determine a hierarchical penetration level among the plurality of hierarchical levels of the multi-layer network to be assigned to the computing device based on the one or more identifiers within the access request message, wherein determining the hierarchical penetration level to be assigned includes the apparatus caused to: compare the one or more identifiers of the access request message to a list of known identifiers and corresponding known hierarchical penetration levels associated with the known identifiers, the list stored in a database; and determine if the one or more identifiers of the access request message matches with any of the known identifiers in the list; and assign the corresponding known hierarchical penetration level as the hierarchical penetration level of the computing device if the one or more identifiers of the access request message matches with any of the known identifiers in the list, or assign a default hierarchical penetration level as the hierarchical penetration level of the computing device if the one or more identifiers does not match with any of the known identifiers in the list, wherein the multi-layer network is configured to grant the computing device access and control privileges for the multi-layer network, the access and control privileges permitting access up to a permitted level of the hierarchical levels of the multi-layer network that corresponds to the hierarchical penetration level assigned to the computing device.

In some example implementations of the apparatus of any preceding example implementation, or any combination thereof, the hierarchical penetration level is a highest available hierarchical penetration level of the hierarchical levels in the multi-layer network for the computing device based on the one or more identifiers, and wherein the one or more identifiers comprise at least a MAC address associated with the computing device.

In some example implementations of the apparatus of any preceding example implementation, or any combination thereof, to determine the highest available hierarchical penetration level for the computing device, the apparatus is configured to determine that the computing device should be assigned to a first hierarchical penetration level, corresponding to a lowest hierarchical level of the multi-layer network, based on an analysis of the MAC address, a communication protocol used by the computing device, and an authentication criterion associated with the computing device.

In some example implementations of the apparatus of any preceding example implementation, or any combination thereof, the apparatus is further configured to assign the first hierarchical penetration level to the computing device, and thereby permit the computing device access and control privileges to an isolated network access and control zone separate from and non-communicative with the rest of the multi-layer network.

In some example implementations of the apparatus of any preceding example implementation, or any combination thereof, to determine the highest available hierarchical penetration level for the computing device, the apparatus is configured to determine that the computing device should be assigned to a second hierarchical penetration level, corresponding to a second lowest hierarchical level of the multi-layer network, based on an analysis of the MAC address, the analysis of the MAC address including a first confirmation that the MAC address is in a computer inventory management database associated with an authentication management device of the multi-layer network, and wherein the authentication management device is in communication with the switch and configured to dynamically update the computer inventory management database with allowed MAC addresses.

In some example implementations of the apparatus of any preceding example implementation, or any combination thereof, the apparatus is further configured to: assign the second hierarchical penetration level to the computing device and grant the computing device access to an isolated network access and control zone isolated from the rest of the multi-layer network except for other devices in the isolated network access and control zone and thereby permit the computing device to communicate with other computing devices within the isolated network access and control zone which have also been assigned to the second hierarchical penetration level.

In some example implementations of the apparatus of any preceding example implementation, or any combination thereof, to determine the highest available hierarchical penetration level for the computing device includes the apparatus configured to determine that the computing device should be assigned to a third hierarchical penetration level, corresponding to a third lowest hierarchical level of the multi-layer network, based on an establishment of communication between the computing device and a proxy server.

In some example implementations of the apparatus of any preceding example implementation, or any combination thereof, the apparatus is further configured to: assign the third hierarchical penetration level to the computing device and grant the computing device access to an isolated network access and control zone isolated from the rest of the multi-layer network except for other devices in the isolated network access and control zone, and thereby permit the computing device to communicate with: other computing devices within the isolated network access and control zone which have also been assigned to the third hierarchical penetration level; and a defined external endpoint that is external to the isolated network access and control zone.

In some example implementations of the apparatus of any preceding example implementation, or any combination thereof, to determine the highest available hierarchical penetration level for the computing device the apparatus is configured to determine that the computing device should be assigned to a fourth hierarchical penetration level, corresponding to a second highest hierarchical level of the multi-layer network, based on an operating system component of the computing device that is accepting of a network authentication certificate or token.

In some example implementations of the apparatus of any preceding example implementation, or any combination thereof, the apparatus is further configured to: assign the fourth hierarchical penetration level to the computing device and grant the computing device access to an isolated network access and control zone isolated from the rest of the multi-layer network except for other devices in the isolated network access and control zone, and thereby permit the computing device to communicate with: other computing devices within the isolated network access and control zone which have also been assigned to the fourth hierarchical penetration level; a defined external endpoint that is external to the isolated network access and control zone; and infrastructure application services in the multi-layer network and outside the isolated network access and control zone.

In some example implementations of the apparatus of any preceding example implementation, or any combination thereof, to determine the highest available hierarchical penetration level for the computing device, the apparatus is configured to determine that the computing device corresponds to a fifth hierarchical penetration level, corresponding to a highest hierarchical level in the multi-layer network, based on a second confirmation, by the switch or apparatus, that the MAC address of the computing device is in an internal database associated with an authentication management device of the multi-layer network, and wherein the authentication management device is in communication with the switch and configured to dynamically update the internal database with MAC addresses of other computing devices allowed into the multi-layer network.

In some example implementations of the apparatus of any preceding example implementation, or any combination thereof, the apparatus is further configured to: assign the fifth hierarchical penetration level to the computing device and grant the computing device access to an isolated network access and control zone isolated from the rest of the multi-layer network except for other devices in the isolated network access and control zone, and thereby permit the computing device to communicate with: other computing devices which have also been assigned to the fifth hierarchical penetration level; a defined external endpoint that is external to the isolated network access and control zone; infrastructure application services in the multi-layer network and outside the isolated network access and control zone; and at least one of the other computing devices or services on the multi-layer network.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DISCLOSURE

Some examples of the present disclosure will now be described more fully hereinafter with reference to the accompanying drawings, in which some, but not all aspects of the disclosure are shown. Indeed, various examples of the disclosure may be embodied in many different forms and should not be construed as limited to the examples set forth herein; rather, these examples are provided so that this disclosure will be thorough and complete, and will fully convey the scope of the disclosure to those skilled in the art. For example, unless otherwise indicated, reference to something as being a first, second or the like should not be construed to imply a particular order. Also, something described as being above something else (unless otherwise indicated) may instead be below, and vice versa; and similarly, something described as being to the left of something else may instead be to the right, and vice versa. Like reference numerals refer to like elements throughout.

Figure 1:
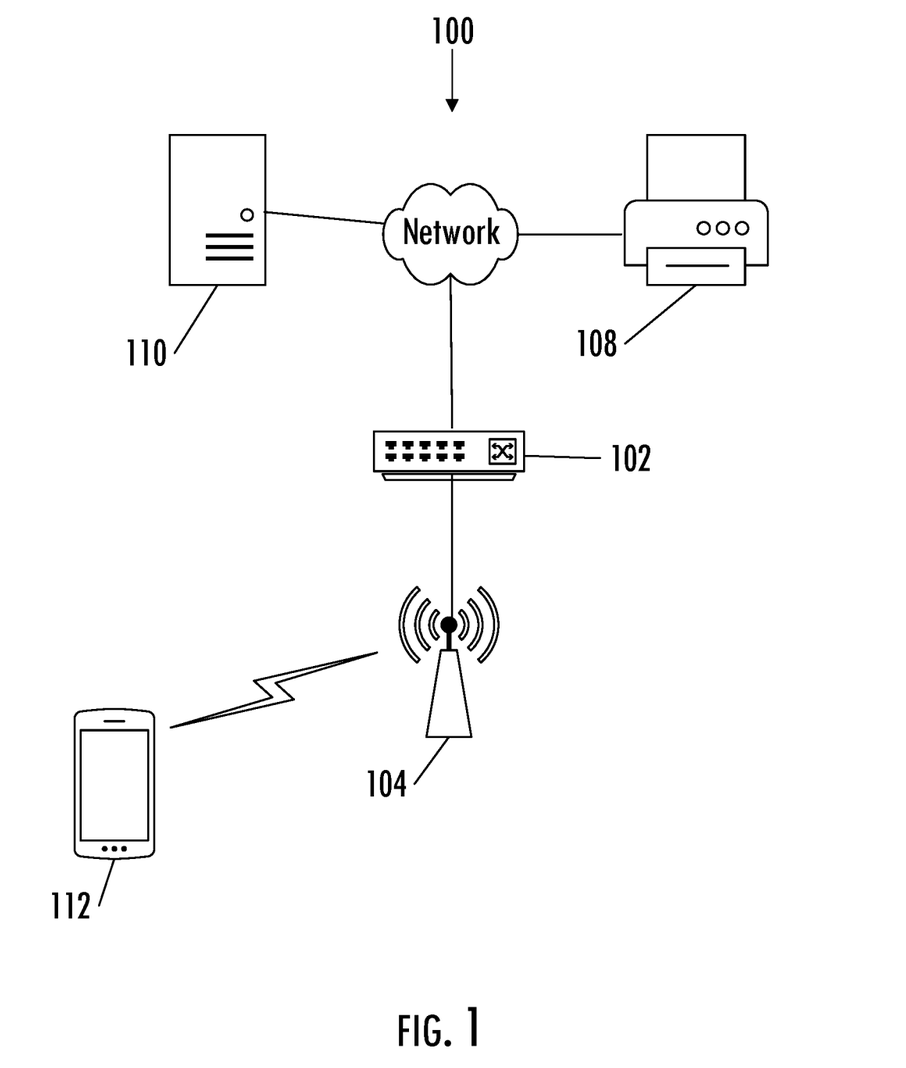
FIG. 1 illustrates an example multi-layer wireless network, according to some embodiments of the present disclosure.

FIG. 1 illustrates a first example embodiment of a hypothetical multi-layer network 100 found in many enterprises and organizations. The present disclosure interchangeably refers to "the multi-layer network" as "the network". The network includes a switch 102 with one or more wireless access points (WAP) 104 connected thereto. The switch connects the WAP to the remainder of the network, including devices such as a printer 108 and one or more servers 110. In a typical network with no security protocols in place, computing device 112 communicates wirelessly with the WAP, which forwards network packets from the computing device through the switch and to the remainder of the network. However, in some cases, the computing device is a security threat and compromise systems in the network. In some example embodiments, the computing device, including computing device 312 described below with respect to FIG. 3B, is any wired or wireless device attempting to connect to the network. For example and without limitation, the computing device is a mobile smart phone, a laptop, tablet computer, desktop computer, server, sensor, Internet of Things (IoT) device, or any other similar computing device that is capable of communicating via a network.

The method and apparatuses of the present disclosure are example security implementations to help protect the network 100 from unwanted intrusion by a potentially unfriendly or unauthorized computing device 112. While the hypothetical network illustrated in FIG. 1 includes a wireless computing device communicating with the network, the apparatuses and method described herein are equally relevant and useful in protecting the network from a wired device, for example, a desktop computer that is plugged, via Ethernet cable, directly into the switch 102. That is, any discussion herein of a computing device trying to communicate with the network is easily interchangeable with a wireless or wired computing device such that the present disclosure would still be applicable.

Figure 2A:
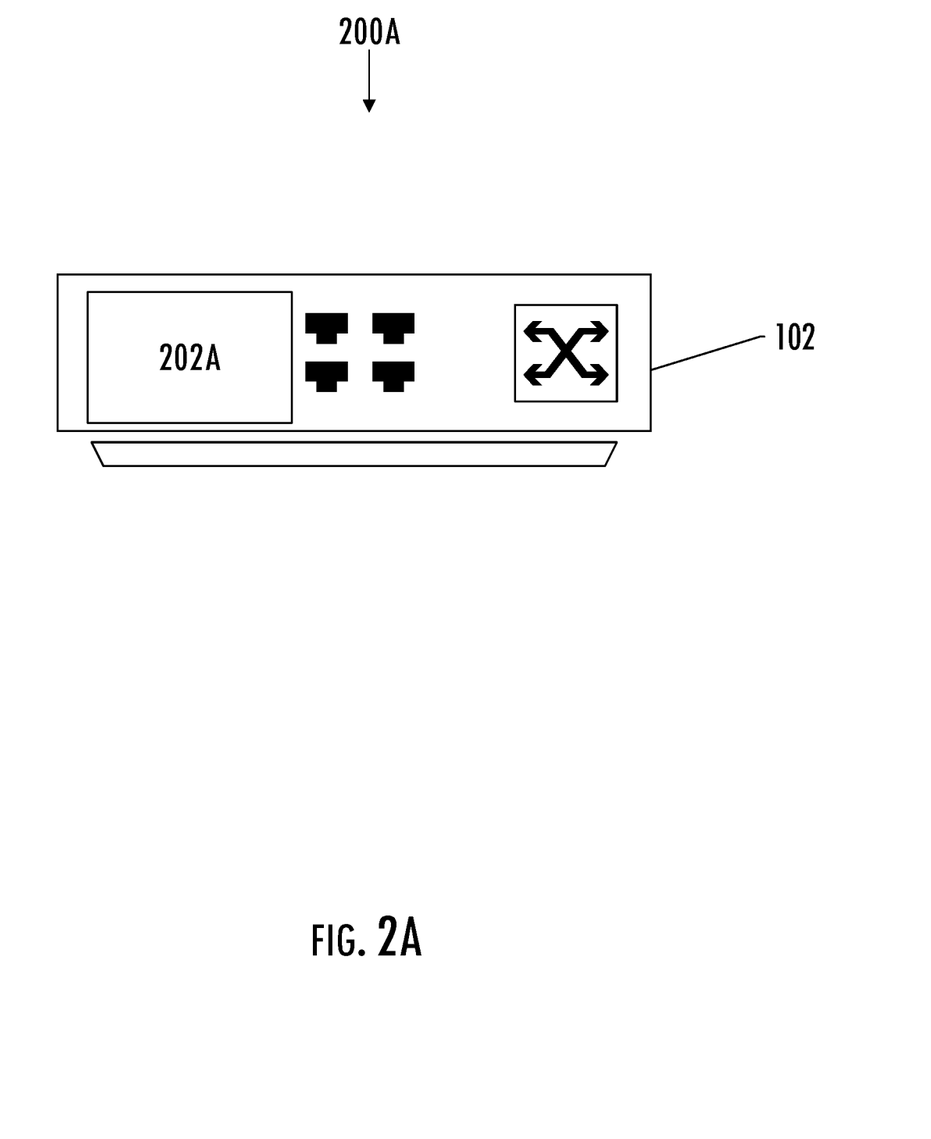
FIG. 2A illustrates an example apparatus collocated with a switch and FIG. 2B illustrates the example apparatus separate from the switch, according to some embodiments of the present disclosure.

FIG. 2A illustrates one example implementation of a security system 200A capable of being used in a multi-layer network 100 like that shown in FIG. 1 for securing the network from computing devices like the computing device 112. The security system includes an apparatus 202A for controlling access of a computing device, such as the computing device from FIG. 1, to a multi-layer network implementing a zero-trust architecture. The security system, which is implemented in any suitable network such as the network in FIG. 1, further comprises a switch for controlling access to a plurality of hierarchical levels of the multi-layer network.

Figure 2B:
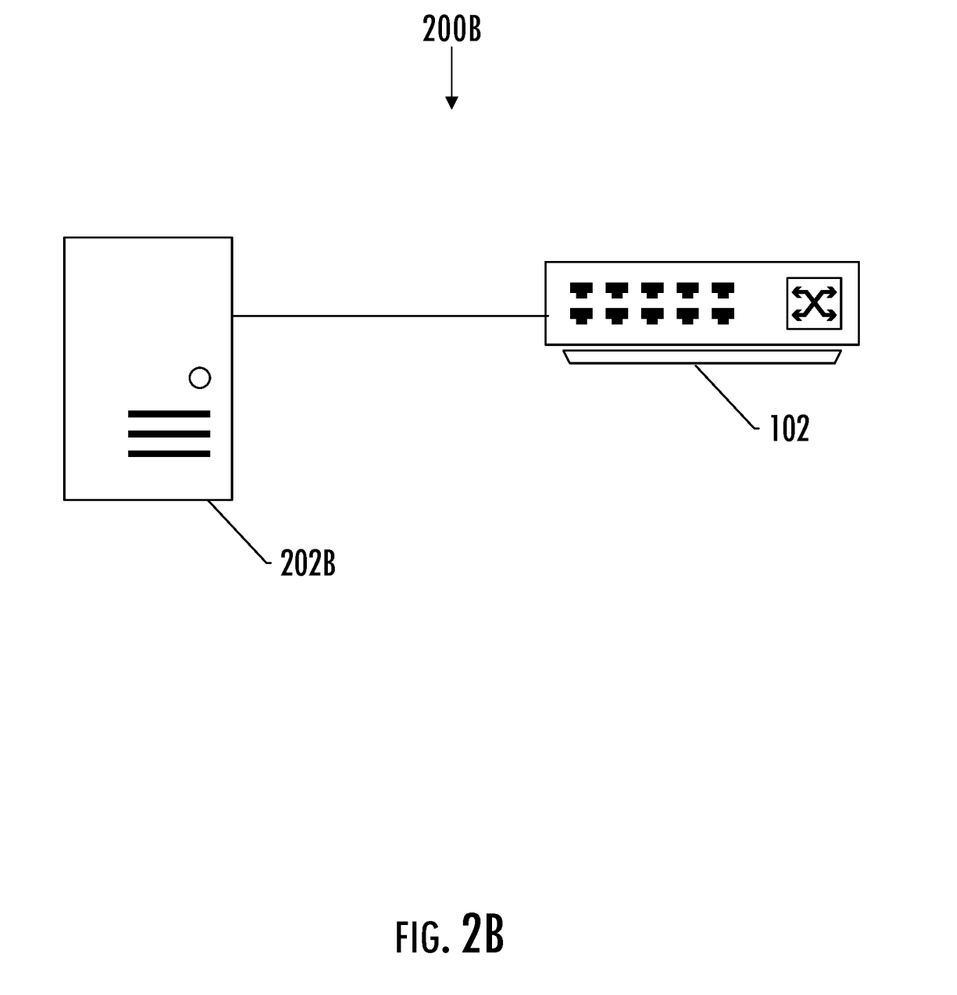

As shown in FIG. 2A, the apparatus 202A is collocated with the switch and is configured to operate as a part of the switch. FIG. 2B illustrates a similar security system 200B as that shown in FIG. 2A, except in FIG. 2B, the apparatus 202B is separate from the switch 102, and is configured to communicate and work with the switch as described herein. In the description below, the switch utilizes the apparatus to perform various functions. In other words, in the case of the security system 200A of FIG. 2A, all of the functions of the apparatus 202A described herein are performed within the switch, whereas in the case of the security system 200B of FIG. 2B, the functions of the apparatus 202B will be performed externally to the switch.

Figure 3A:
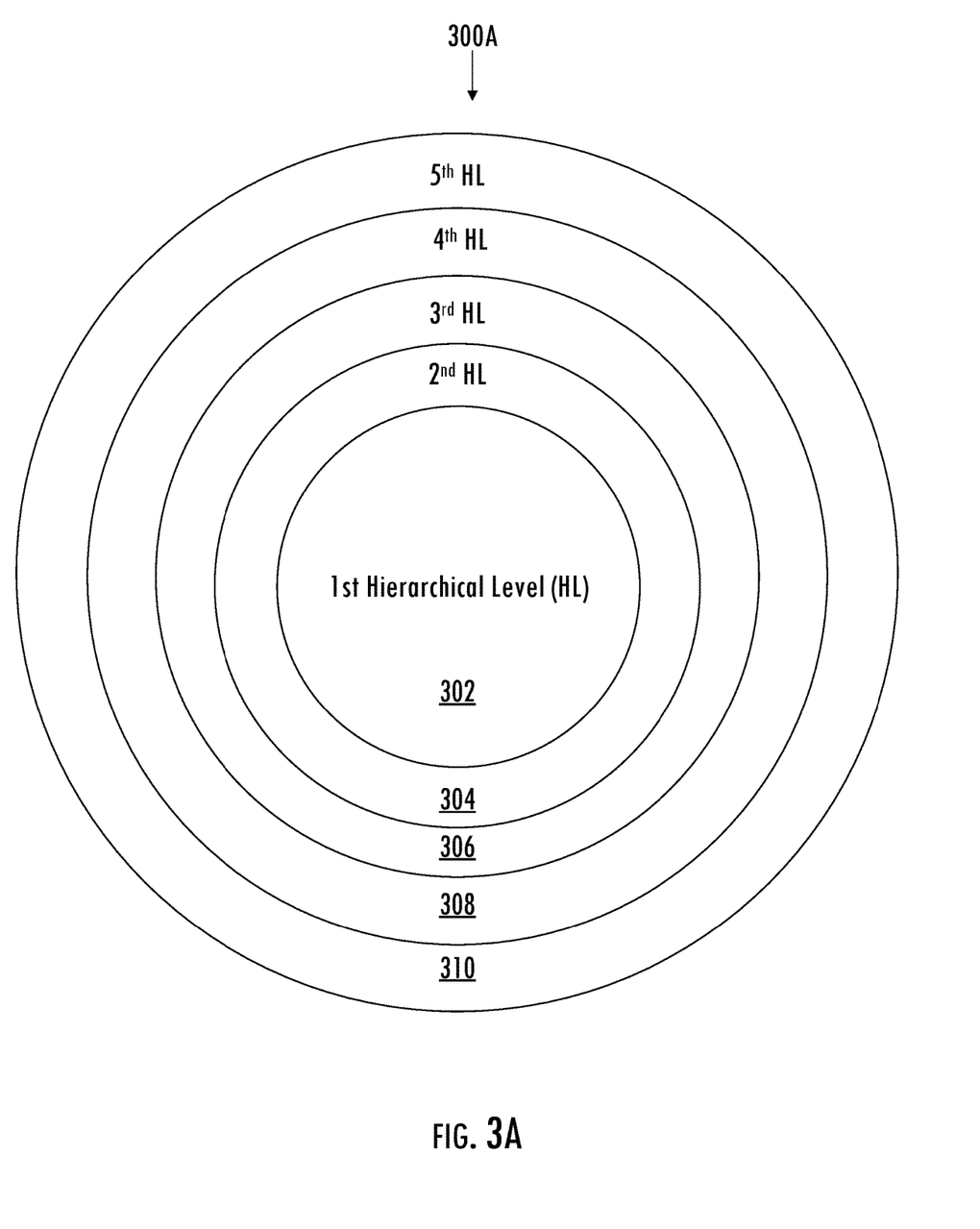
FIG. 3A illustrates an example network hierarchical diagram and FIG. 3B illustrates an example multi-layer network with the example apparatus collocated with the switch, according to some embodiments of the present disclosure.
Figure 3B:
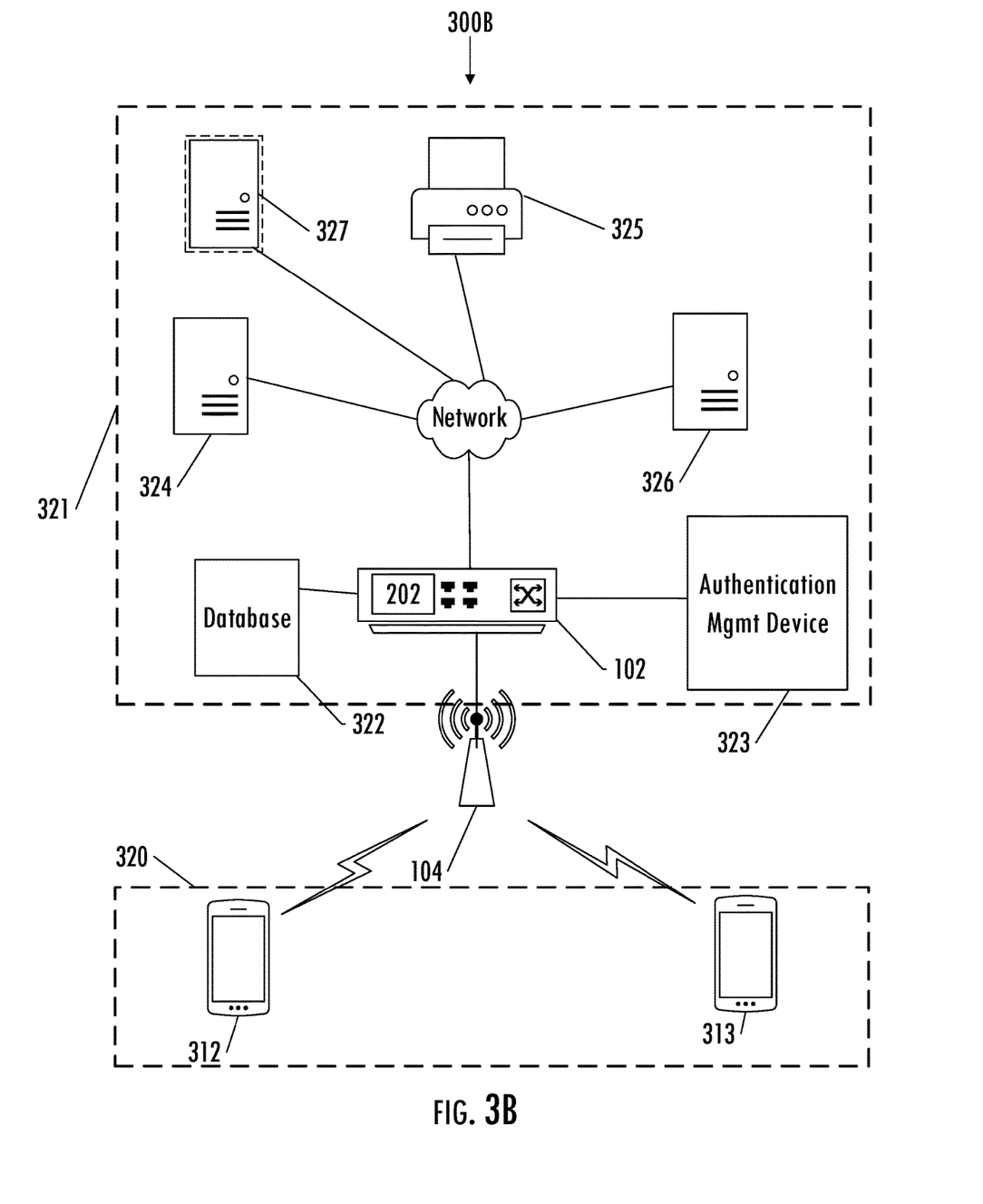

FIG. 3A illustrates a network hierarchical diagram 300A, including 5 hierarchical levels of the network. In this figure, five hierarchical levels are shown. These hierarchical levels indicate security levels of devices in the multi-layer network 300B illustrated in FIG. 3B. The devices of the multi-layer network are logically divided into hierarchical levels, a first hierarchical level 302, a second hierarchical level 304, a third hierarchical level 306, a fourth hierarchical level 308, and a fifth hierarchical level 310. Various devices throughout the network are assigned to each of the hierarchical levels. For example, payroll servers are in the fifth hierarchical level and printers are in the third hierarchical level. Different hierarchical levels enable different access and control privileges within the multi-layer network such that only the most trusted devices are able to access the highest hierarchical level, the fifth hierarchical level 310. Devices that are not as well trusted or are new to the environment altogether, will only be able to access the lower hierarchical levels and therefore, fewer parts of the network.

Each device in the multi-layer network 300B is also assigned a hierarchical penetration level. The hierarchical penetration level corresponds to the maximum hierarchical level within the network that a device is permitted to penetrate or access. Each device assigned a hierarchical penetration level is allowed to penetrate the maximum hierarchical level corresponding to its assigned hierarchical penetration level, as well as every hierarchical level below its assigned level. For example, if a computing device is assigned the fifth hierarchical penetration level, the computing device will have permission to communicate with the appropriate devices within the fifth hierarchical level 310 as well as any of the devices in the fourth hierarchical level 308, third hierarchical level 306, and so on. However, when assigned a hierarchical penetration level, the computing device cannot penetrate into a hierarchical level in the multi-layer network higher than its assigned hierarchical penetration level.

FIG. 3B illustrates an example multi-layer network 300B according to some embodiments of the present disclosure. Similar to the multi-layer network 100 shown in FIG. 1, the example multi-layer network of FIG. 3B includes a switch 102 with an apparatus 202 collocated with the switch, the apparatus for controlling access of a computing device, such as first computing device 312, to the multi-layer network which is implementing a zero-trust architecture. The multi-layer network is comprised of a plurality of hierarchical levels, similar to the description of FIG. 3A, wherein various network components are assigned to various ones of the hierarchical levels.

In some embodiments, the apparatus 202 comprises a memory having non-transitory executable instructions stored therein, which when executed by one or more processors of the apparatus (or the switch 102), cause the apparatus to receive an access request message from a computing device (e.g., the first computing device 312, second computing device 313, or any other wired or wireless computing device in communication with the switch), the access request message including one or more identifiers associated with the computing device for requesting access to the multi-layer network 300B. In some examples, the one or more identifiers comprise at least a MAC address associated with the computing device.

The apparatus 202 is further configured to determine a hierarchical penetration level among the plurality of hierarchical levels of the multi-layer network 300B to be assigned to the computing device based on the one or more identifiers within the access request message. In order to determine the hierarchical penetration level to be assigned to the computing device, the apparatus is configured to compare the one or more identifiers of the access request message to a list of known identifiers and corresponding known hierarchical penetration levels associated with the known identifiers, the list stored in a database 322 in communication with or stored on the switch 102. For example, the one or more identifiers of the access request message includes a MAC address, and the apparatus compares the received MAC address to a list of known MAC addresses with corresponding known hierarchical penetration levels associated with the known MAC addresses. Alternatively, the one or more identifiers of the access request message includes a manufacturing serial number of the computing device 112 or any other piece of data that uniquely identifies the computing device.

Next, the apparatus 202 is further configured to determine, based on the comparison, if the one or more identifiers (e.g., the received MAC address or any other suitable identifier received within the access request message) of the access request message matches with any of the known identifiers in the list. The apparatus is then configured to assign the corresponding known hierarchical penetration level as the hierarchical penetration level of the computing device if the one or more identifiers of the access request message matches with any of the known identifiers in the list. If the one or more identifiers of the access request message does not match with any of the known identifiers in the list, the apparatus is configured to assign a default hierarchical penetration level as the hierarchical penetration level of the computing device. The multi-layer network 300B, including the switch 102, is configured to grant the computing device access and control privileges for the multi-layer network, the access and control privileges permitting access up to a permitted level of the hierarchical levels of the multi-layer network that corresponds to the hierarchical penetration level assigned to the computing device. In some examples, instead of assigning the default hierarchical penetration level, the computing device is not allowed any access to the multi-layer network 300B.

The assigned hierarchical penetration level is a highest available hierarchical penetration level of the hierarchical levels in the multi-layer network 300B for the computing device based on at least the one or more identifiers. Furthermore, the apparatus 202 is configured to determine that the computing device should be assigned to a first hierarchical penetration level, corresponding to a lowest hierarchical level of the multi-layer network, based on an analysis of the MAC address (i.e., the one or more identifiers), a communication protocol used by the computing device, and an authentication criterion associated with the computing device. Some example communication protocols used by the computing device include an Ethernet 802 protocol, cellular protocol, or Bluetooth®. Some example authentication criteria associated with the computing device include certificate-based authentication criteria, token based authentication criteria, multi-factor (e.g., badge or pin) criteria, and access control listings (ACL) criteria. If it is determined that the computing device should be assigned the first hierarchical penetration level, the apparatus is further configured to assign the first hierarchical penetration level to the computing device, and thereby permit the computing device access and control privileges to an isolated network access and control zone 320 separate from and non-communicative with the rest of the multi-layer network 321.

The apparatus 202 is further configured to determine that the computing device should be assigned to a second hierarchical penetration level, corresponding to a second lowest hierarchical level of the multi-layer network 300B, based on an analysis of the MAC address, the analysis of the MAC address including a first confirmation, by the apparatus, that the MAC address is in a computer inventory management database associated with an authentication management device 323 of the multi-layer network. The authentication management device is a server, computer, or other suitable device in communication with or comprising the computer inventory management database that manages authentication of users on the network. As new users are allowed onto the network, appropriate information for the user devices is stored in the computer inventory management database. The computer inventory management database is separate from the list of known identifiers stored in the database 322. In some embodiments, the authentication management device is in communication with the switch and configured to dynamically update the computer inventory management database with allowed MAC addresses.

If it is determined that the computing device should be assigned the second hierarchical penetration level, the apparatus is further configured to assign the second hierarchical penetration level to the computing device and thereby permit the computing device access to the isolated network access and control zone 320 isolated from the rest of the multi-layer network 321 except for other devices in the isolated network access and control zone. For example, assigning the second hierarchical penetration level to the computing device permits the computing device to communicate with other computing devices, such as second computing device 313, within the isolated network access and control zone which have also been assigned to the second hierarchical penetration level.

The apparatus 202 is further configured to determine that the computing device should be assigned to a third hierarchical penetration level, corresponding to a third lowest hierarchical level of the multi-layer network 300B, based on an establishment of communication (e.g., through transmission control protocol/internet protocol [TCP/IP] communication protocols, one or two-way information transmission occurs) between the computing device and a proxy server 324. If it is determined that the computing device should be assigned the third hierarchical penetration level, the apparatus is further configured to assign the third hierarchical penetration level to the computing device and thereby permit the computing device access to the isolated network access and control zone 320 isolated from the rest of the multi-layer network 321 except for other devices in the isolated network access and control zone.

Furthermore, assigning the third hierarchical penetration level to the computing device permits the computing device to communicate with other computing devices within the isolated network access and control zone which have also been assigned to the third hierarchical penetration level and defined external endpoint that is external to the isolated network access and control zone, such as printer 325.

The apparatus 202 is further configured to determine that the computing device should be assigned to a fourth hierarchical penetration level, corresponding to a second highest hierarchical level of the multi-layer network 300B, based on an operating system component of the computing device that is accepting of a network authentication certificate or token. An example operating system component includes encryption credentials of the operating system. If it is determined that the computing device should be assigned the fourth hierarchical penetration level, the computing device is configured to assign the fourth hierarchical penetration level to the computing device, and thereby permit the computing device access to the isolated network access and control zone 320 isolated from the rest of the multi-layer network 321 except for other devices in the isolated network access and control zone.

Furthermore, assigning the fourth hierarchical penetration level to the computing device permits the computing device to communicate with other computing devices within the isolated network access and control zone 320 which have also been assigned to the higher hierarchical penetration level, such as second computing device 313, a defined external endpoint that is external to the isolated network access and control zone, such as the printer 325; and infrastructure application services 326 in the multi-layer network and outside the isolated network access and control zone. Some example infrastructure application services include a mobile device management application service and a network management application service.

The apparatus 202 is further configured to determine that the computing device should be assigned to a fifth hierarchical penetration level, corresponding to a highest hierarchical level in the multi-layer network 300B, based on a second confirmation that the MAC address of the computing device 312 is in an internal database associated with the authentication management device 323 of the multi-layer network. The second confirmation that the MAC address of the computing device is in the internal database includes comparing validation criteria of the computing device to entries in the internal database and then checking the public key infrastructure (PKI) authentication certificate database which will associate certificates with devices. The authentication management device is configured to dynamically update the internal database with MAC addresses of other computing devices allowed into the multi-layer network. If it is determined that the computing device should be assigned the fifth hierarchical penetration level, the computing device is configured to assign the fifth hierarchical penetration level to the computing device, and thereby permit the computing device access to the isolated network access and control zone 320 isolated from the rest of the multi-layer network except for other devices in the isolated network access and control zone.

Furthermore, assigning the fifth hierarchical penetration level to the computing device permits the computing device to communicate with other computing devices (e.g., those within the isolated network access and control zone 320) which have also been assigned to the fifth hierarchical penetration level, such as second computing device 313. After being assigned the fifth hierarchical penetration level, the computing device is further permitted to communicate with the defined external endpoint that is external to the isolated network access and control zone, such as printer 325, infrastructure application services 326 in the multi-layer network and outside the isolated network access and control zone 320, and at least one of the other computing devices or services on the network 300B, such as virtual server 327.

Computing devices assigned to the same hierarchical penetration level are permitted to communicate with each other. However, computing devices are not permitted to communicate with computing devices assigned to different hierarchical penetration levels than their own (e.g., a smart phone assigned to hierarchical penetration level 1 cannot communicate with a tablet assigned to hierarchical penetration level 5, and vice-versa).

Figure 4:
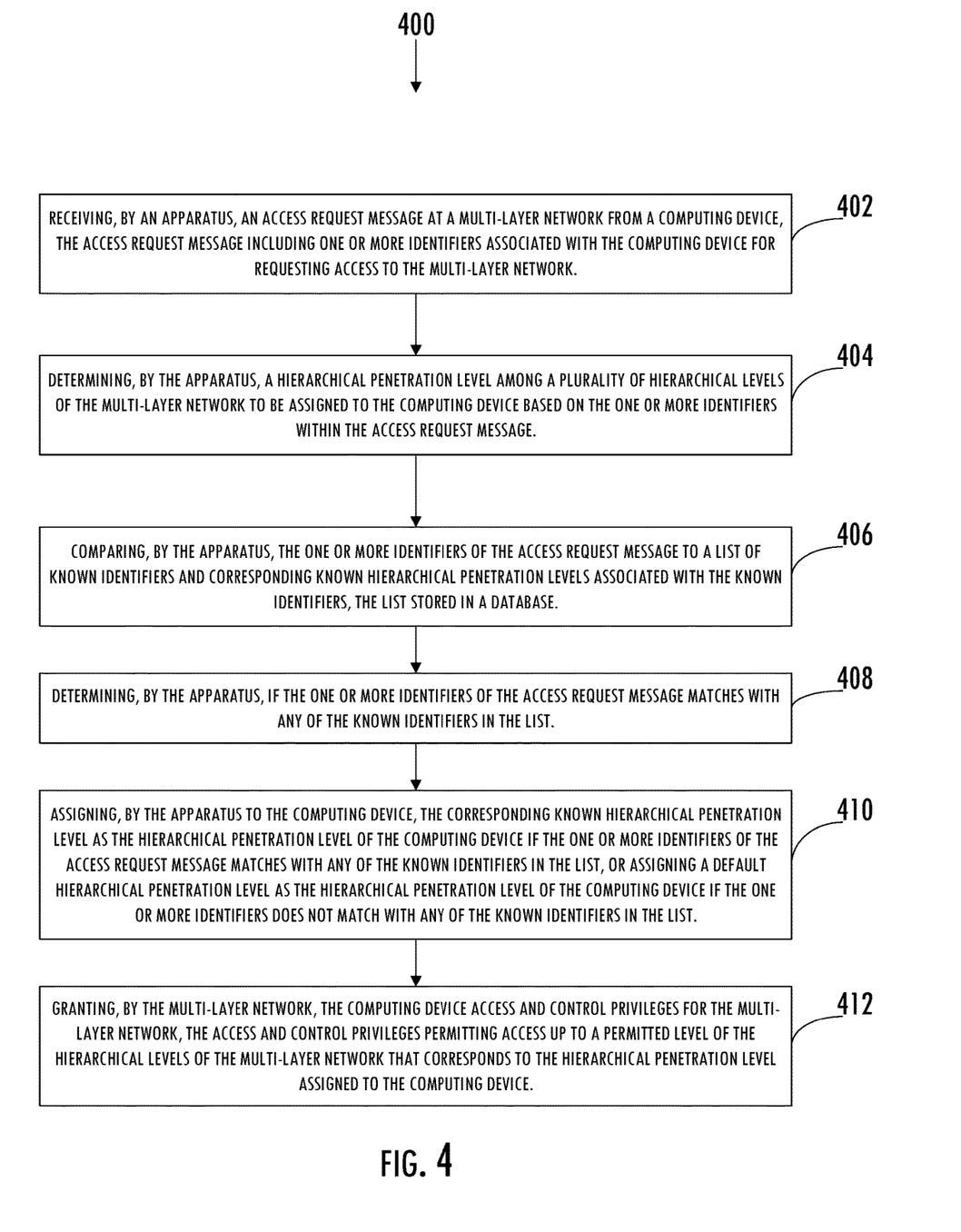
FIG. 4 illustrates a flow chart detailing steps of an example method, according to some embodiments of the present disclosure.

FIG. 4 is a flow chart depicting an example method 400 for controlling access of a computing device to a multi-layer network implementing a zero-trust architecture, according to some embodiments of the present disclosure. The method is performed using an apparatus, such as the apparatus 202 from FIG. 3B. The multi-layer network comprises a switch and the apparatus for controlling access to a plurality of hierarchical levels of the multi-layer network, and the method includes receiving, by the apparatus, an access request message at the multi-layer network from the computing device, the access request message including one or more identifiers associated with the computing device for requesting access to the multi-layer network, as shown at block 402. The method includes determining, by the apparatus, a hierarchical penetration level among the plurality of hierarchical levels of the multi-layer network to be assigned to the computing device based on the one or more identifiers within the access request message, wherein determining the hierarchical penetration level to be assigned includes, as shown at block 404.

In some implementations of the method 400, determining the hierarchical penetration level to be assigned includes: comparing, by the apparatus, the one or more identifiers of the access request message to a list of known identifiers and corresponding known hierarchical penetration levels associated with the known identifiers, the list stored in a database in communication with or stored on the switch, as shown at block 406; and determining, by the apparatus, if the one or more identifiers of the access request message matches with any of the known identifiers in the list, as shown at block 408.

The method 400 further includes assigning, by the apparatus to the computing device, the corresponding known hierarchical penetration level as the hierarchical penetration level of the computing device if the one or more identifiers of the access request message matches with any of the known identifiers in the list, or assigning a default hierarchical penetration level as the hierarchical penetration level of the computing device if the one or more identifiers does not match with any of the known identifiers in the list, as shown at block 410. And the method includes granting, by the multi-layer network, the computing device access and control privileges for the multi-layer network, the access and control privileges permitting access up to a permitted level of the hierarchical levels of the multi-layer network that corresponds to the hierarchical penetration level assigned to the computing device, as shown at block 412.

According to example implementations of the present disclosure, the apparatus 202 is implemented by various means. Means for implementing the apparatus includes hardware, alone or under direction of one or more computer programs from a computer-readable storage medium. In some examples, one or more apparatuses are configured to function as or otherwise implement the apparatus shown and described herein. In examples involving more than one apparatus, the respective apparatuses are connected to or otherwise in communication with one another in a number of different manners, such as directly or indirectly via a wired or wireless network or the like.

Figure 5:
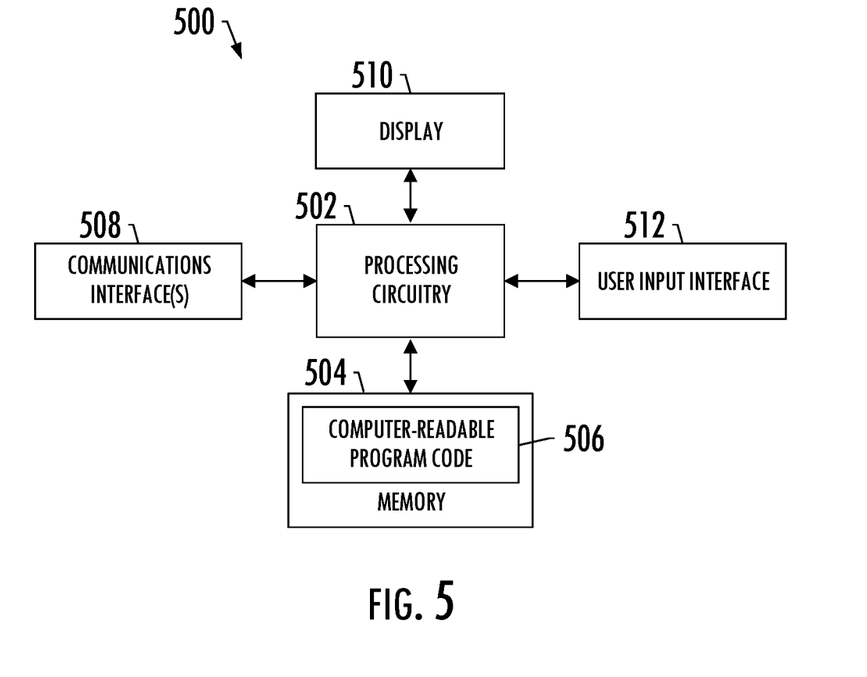
FIG. 5 illustrates an example apparatus for performing the method and other functions described herein, according to some embodiments of the present disclosure.

FIG. 5 illustrates an apparatus 500 according to some example implementations of the present disclosure that is collocated with or separate from the switch 102 illustrated in FIG. 3B. The apparatus 500 is an example device that is used to implement the method and functions described above with respect to the apparatus 202 in FIGS. 2A, 2B, and 3B. Generally, an apparatus of exemplary implementations of the present disclosure comprises, includes, or is embodied in one or more fixed or portable electronic devices. Examples of suitable electronic devices include a microcontroller, controller, smartphone, tablet computer, laptop computer, desktop computer, workstation computer, server computer or the like. The apparatus includes one or more of each of a number of components such as, for example, processing circuitry 502 (e.g., processor unit or computer processor) connected to a memory 504 (e.g., storage device).

The processing circuitry 502 is composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which is packaged as an integrated circuit or multiple interconnected integrated circuits (an integrated circuit at times more commonly referred to as a "chip"). The processing circuitry is configured to execute computer programs, which are stored onboard the processing circuitry or otherwise stored in the memory 504 (of the same or another apparatus).

The processing circuitry 502 includes a number of processors, a multi-core processor or some other type of processor, depending on the particular implementation. Further, the processing circuitry is implemented using a number of heterogeneous processor systems in which a main processor is present with one or more secondary processors on a single chip. As another illustrative example, the processing circuitry is a symmetric multi-processor system containing multiple processors of the same type. In yet another example, the processing circuitry is embodied as or otherwise include one or more ASICs, FPGAs or the like. Thus, although the processing circuitry is capable of executing a computer program to perform one or more functions, the processing circuitry of various examples is capable of performing one or more functions without the aid of a computer program. In either instance, the processing circuitry is appropriately programmed to perform functions or operations according to example implementations of the present disclosure.

The memory 504 is generally any piece of computer hardware that is capable of storing information such as, for example, data, computer programs (e.g., computer-readable program code 506) and/or other suitable information either on a temporary basis and/or a permanent basis. The memory includes volatile and/or non-volatile memory, and is fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks include compact disk-read only memory (CD-ROM), compact disk-read/write (CD-R/W), DVD or the like. In various instances, the memory is referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein generally refer to a computer-readable storage medium or computer-readable transmission medium.

All processing circuitry 502, memory 504, computer-readable program code 506, and other electronic devices discussed above are separate from the electronics of the switch 102, but still located within a housing of the switch, integrated with the electronics of the switch, or be a completely separate computing device from the switch (e.g., FIG. 2B).

In addition to the memory 504, the processing circuitry 502 connects to one or more interfaces for displaying, transmitting and/or receiving information. The interfaces include a communications interface 508 (e.g., communications unit) and/or one or more user interfaces. The communications interface is configured to transmit and/or receive information, such as to and/or from other apparatus(es), network(s) or the like. The communications interface is configured to transmit and/or receive information by physical (wired) and/or wireless communications links. Examples of suitable communication interfaces include a network interface controller (NIC), wireless NIC (WNIC) or the like.

The user interfaces includes a display 510 and/or one or more user input interfaces 512 (e.g., input/output unit). The display is configured to present or otherwise display information to a user, suitable examples of which include a liquid crystal display (LCD), light-emitting diode display (LED), plasma display panel (PDP) or the like. The user input interfaces are wired or wireless, and are configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces further includes one or more interfaces for communicating with peripherals such as printers, scanners or the like.

As indicated above, program code instructions are stored in memory (e.g., in the switch's memory or in a separate memory), and executed by processing circuitry that is thereby programmed, to implement functions of the systems, subsystems, tools and their respective elements described herein. As will be appreciated, any suitable program code instructions are loaded onto a computer or other programmable apparatus from a computer-readable storage medium to produce a particular machine, such that the particular machine becomes a means for implementing the functions specified herein. These program code instructions are also stored in a computer-readable storage medium that directs a computer, a processing circuitry or other programmable apparatus to function in a particular manner to thereby generate a particular machine or particular article of manufacture. The instructions stored in the computer-readable storage medium produces an article of manufacture, where the article of manufacture becomes a means for implementing functions described herein. The program code instructions are retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions are performed sequentially such that one instruction is retrieved, loaded and executed at a time. In some example implementations, retrieval, loading and/or execution are performed in parallel such that multiple instructions are retrieved, loaded, and/or executed together. Execution of the program code instructions produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, the apparatus 500 includes the processing circuitry 502 and the computer-readable storage medium or memory 504 coupled to the processing circuitry, where the processing circuitry is configured to execute computer-readable program code 506 stored in the memory. It will also be understood that one or more functions, and combinations of functions, are implemented by special purpose hardware-based computer systems and/or processing circuitry which perform the specified functions, or combinations of special purpose hardware and program code instructions.

Many modifications and other implementations of the inventions set forth herein will come to mind to one skilled in the art to which these disclosed implementations pertain having the benefit of the teachings presented in the foregoing descriptions and the associated drawings. Therefore, it is to be understood that implementations of the invention are not to be limited to the specific implementations disclosed and that modifications and other implementations are intended to be included within the scope of the invention. Moreover, although the foregoing descriptions and the associated drawings describe example implementations in the context of certain example combinations of elements and/or functions, it should be appreciated that different combinations of elements and/or functions may be provided by alternative implementations without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular implementations only and is not intended to be limiting.

That which is claimed:

1. A method for controlling access of a computing device to a multi-layer network implementing a zero-trust architecture, the multi-layer network comprising a switch and an apparatus for controlling access to a plurality of hierarchical levels of the multi-layer network, the method comprising:

receiving, by the apparatus, an access request message at the multi-layer network from the computing device, the access request message including one or more identifiers associated with the computing device for requesting access to the multi-layer network;

determining, by the apparatus, a hierarchical penetration level among the plurality of hierarchical levels of the multi-layer network to be assigned to the computing device based on the one or more identifiers within the access request message, wherein determining the hierarchical penetration level to be assigned includes:

comparing, by the apparatus, the one or more identifiers of the access request message to a list of known identifiers and corresponding known hierarchical penetration levels associated with the known identifiers, the list stored in a database; and determining, by the apparatus, if the one or more identifiers of the access request message matches with any of the known identifiers in the list;

assigning, by the apparatus to the computing device, the corresponding known hierarchical penetration level as the hierarchical penetration level of the computing device if the one or more identifiers of the access request message matches with any of the known identifiers in the list, or assigning a default hierarchical penetration level as the hierarchical penetration level of the computing device if the one or more identifiers does not match with any of the known identifiers in the list; and granting, by the multi-layer network, the computing device access and control privileges for the multi-layer network, the access and control privileges permitting access up to a permitted level of the hierarchical levels of the multi-layer network that corresponds to the hierarchical penetration level assigned to the computing device.

2. The method of claim 1, wherein the hierarchical penetration level is a highest available hierarchical penetration level of the hierarchical levels in the multi-layer network for the computing device based on the one or more identifiers, and wherein the one or more identifiers comprise at least a MAC address associated with the computing device.

3. The method of claim 2, wherein determining the highest available hierarchical penetration level for the computing device includes determining that the computing device should be assigned to a first hierarchical penetration level, corresponding to a lowest hierarchical level of the multi-layer network, based on an analysis of the MAC address, a communication protocol used by the computing device, and an authentication criterion associated with the computing device.

4. The method of claim 3, further comprising assigning, by the apparatus, the first hierarchical penetration level to the computing device, and thereby permitting the computing device access and control privileges to an isolated network access and control zone separate from and non-communicative with the rest of the multi-layer network.

5. The method of claim 2, wherein determining the highest available hierarchical penetration level for the computing device includes determining that the computing device should be assigned to a second hierarchical penetration level, corresponding to a second lowest hierarchical level of the multi-layer network, based on an analysis of the MAC address, the analysis of the MAC address including a first confirmation that the MAC address is in a computer inventory management database associated with an authentication management device of the multi-layer network, and wherein the authentication management device is in communication with the switch and configured to dynamically update the computer inventory management database with allowed MAC addresses.

6. The method of claim 5, further comprising:

assigning, by the apparatus, the second hierarchical penetration level to the computing device, and thereby permitting the computing device access to an isolated network access and control zone isolated from the rest of the multi-layer network except for other devices in the isolated network access and control zone; and permitting the computing device to communicate with other computing devices within the isolated network access and control zone which have also been assigned to the second hierarchical penetration level.

7. The method of claim 2, wherein determining the highest available hierarchical penetration level for the computing device includes determining that the computing device should be assigned to a third hierarchical penetration level, corresponding to a third lowest hierarchical level of the multi-layer network, based on an establishment of communication between the computing device and a proxy server.

8. The method of claim 7, further comprising:

assigning, by the apparatus, the third hierarchical penetration level to the computing device, and thereby permitting the computing device access to an isolated network access and control zone isolated from the rest of the multi-layer network except for other devices in the isolated network access and control zone; and permitting the computing device to communicate with:

other computing devices within the isolated network access and control zone which have also been assigned to the third hierarchical penetration level; and a defined external endpoint that is external to the isolated network access and control zone.

9. The method of claim 2, wherein determining the highest available hierarchical penetration level for the computing device includes determining that the computing device should be assigned to a fourth hierarchical penetration level, corresponding to a second highest hierarchical level of the multi-layer network, based on an operating system component of the computing device that is accepting of a network authentication certificate or token.

10. The method of claim 9, further comprising:

assigning, by the apparatus, the fourth hierarchical penetration level to the computing device, and thereby permitting the computing device access to an isolated network access and control zone isolated from the rest of the multi-layer network except for other devices in the isolated network access and control zone; and permitting the computing device to communicate with:

other computing devices within the isolated network access and control zone which have also been assigned to the fourth hierarchical penetration level;

a defined external endpoint that is external to the isolated network access and control zone; and infrastructure application services in the multi-layer network and outside the isolated network access and control zone.

11. The method of claim 2, wherein determining the highest available hierarchical penetration level for the computing device includes determining that the computing device should be assigned to a fifth hierarchical penetration level, corresponding to a highest hierarchical level in the multi-layer network, based on a second confirmation that the MAC address of the computing device is in an internal database associated with an authentication management device of the multi-layer network, and wherein the authentication management device is in communication with the switch and configured to dynamically update the internal database with MAC addresses of other computing devices allowed into the multi-layer network.

12. The method of claim 11, further comprising:
assigning, by the apparatus, the fifth hierarchical penetration level to the computing device and thereby permitting the computing device access to an isolated network access and control zone isolated from the rest of the multi-layer network except for other devices in the isolated network access and control zone; and
permitting the computing device to communicate with:
　other computing devices which have also been assigned to the fifth hierarchical penetration level;
　a defined external endpoint that is external to the isolated network access and control zone;
　infrastructure application services in the multi-layer network and outside the isolated network access and control zone; and
　at least one of the other computing devices or services on the multi-layer network.

13. An apparatus for controlling access of a computing device to a multi-layer network implementing a zero-trust architecture, the multi-layer network comprising a switch and the apparatus for controlling access to a plurality of hierarchical levels of the multi-layer network, the apparatus comprising a non-transitory memory having executable instructions stored therein, that when executed by one or more processors of the apparatus, cause the apparatus to:
　receive an access request message from the computing device, the access request message including one or more identifiers associated with the computing device for requesting access to the multi-layer network;
　determine a hierarchical penetration level among the plurality of hierarchical levels of the multi-layer network to be assigned to the computing device based on the one or more identifiers within the access request message, wherein determining the hierarchical penetration level to be assigned includes the apparatus caused to:
　　compare the one or more identifiers of the access request message to a list of known identifiers and corresponding known hierarchical penetration levels associated with the known identifiers, the list stored in a database; and
　　determine if the one or more identifiers of the access request message matches with any of the known identifiers in the list; and
　assign the corresponding known hierarchical penetration level as the hierarchical penetration level of the computing device if the one or more identifiers of the access request message matches with any of the known identifiers in the list, or assign a default hierarchical penetration level as the hierarchical penetration level of the computing device if the one or more identifiers does not match with any of the known identifiers in the list,
　wherein the multi-layer network is configured to grant the computing device access and control privileges for the multi-layer network, the access and control privileges permitting access up to a permitted level of the hierarchical levels of the multi-layer network that corresponds to the hierarchical penetration level assigned to the computing device.

14. The apparatus of claim 13, wherein the hierarchical penetration level is a highest available hierarchical penetration level of the hierarchical levels in the multi-layer network for the computing device based on the one or more identifiers, and
wherein the one or more identifiers comprise at least a MAC address associated with the computing device.

15. The apparatus of claim 14, wherein to determine the highest available hierarchical penetration level for the computing device, the apparatus is configured to determine that the computing device should be assigned to a first hierarchical penetration level, corresponding to a lowest hierarchical level of the multi-layer network, based on an analysis of the MAC address, a communication protocol used by the computing device, and an authentication criterion associated with the computing device.

16. The apparatus of claim 15, further configured to assign the first hierarchical penetration level to the computing device, and thereby permit the computing device access and control privileges to an isolated network access and control zone separate from and non-communicative with the rest of the multi-layer network.

17. The apparatus of claim 14, wherein to determine the highest available hierarchical penetration level for the computing device, the apparatus is configured to determine that the computing device should be assigned to a second hierarchical penetration level, corresponding to a second lowest hierarchical level of the multi-layer network, based on an analysis of the MAC address, the analysis of the MAC address including a first confirmation that the MAC address is in a computer inventory management database associated with an authentication management device of the multi-layer network, and
wherein the authentication management device is in communication with the switch and configured to dynamically update the computer inventory management database with allowed MAC addresses.

18. The apparatus of claim 17, further configured to:
assign the second hierarchical penetration level to the computing device and grant the computing device access to an isolated network access and control zone isolated from the rest of the multi-layer network except for other devices in the isolated network access and control zone and thereby permit the computing device to communicate with other computing devices within the isolated network access and control zone which have also been assigned to the second hierarchical penetration level.

19. The apparatus of claim 14, wherein to determine the highest available hierarchical penetration level for the computing device includes the apparatus configured to determine that the computing device should be assigned to a third hierarchical penetration level, corresponding to a third lowest hierarchical level of the multi-layer network, based on an establishment of communication between the computing device and a proxy server.

20. The apparatus of claim 19, further configured to:
assign the third hierarchical penetration level to the computing device and grant the computing device access to an isolated network access and control zone isolated from the rest of the multi-layer network except for other devices in the isolated network access and control zone, and thereby permit the computing device to communicate with:

other computing devices within the isolated network access and control zone which have also been assigned to the third hierarchical penetration level; and a defined external endpoint that is external to the isolated network access and control zone.

21. The apparatus of claim 14, wherein to determine the highest available hierarchical penetration level for the computing device the apparatus is configured to determine that the computing device should be assigned to a fourth hierarchical penetration level, corresponding to a second highest hierarchical level of the multi-layer network, based on an operating system component of the computing device that is accepting of a network authentication certificate or token.

22. The apparatus of claim 21, further configured to:

assign the fourth hierarchical penetration level to the computing device and grant the computing device access to an isolated network access and control zone isolated from the rest of the multi-layer network except for other devices in the isolated network access and control zone, and thereby permit the computing device to communicate with:

other computing devices within the isolated network access and control zone which have also been assigned to the fourth hierarchical penetration level;

a defined external endpoint that is external to the isolated network access and control zone; and infrastructure application services in the multi-layer network and outside the isolated network access and control zone.

23. The apparatus of claim 14, wherein to determine the highest available hierarchical penetration level for the computing device, the apparatus is configured to determine that the computing device corresponds to a fifth hierarchical penetration level, corresponding to a highest hierarchical level in the multi-layer network, based on a second confirmation, by the switch or the apparatus, that the MAC address of the computing device is in an internal database associated with an authentication management device of the multi-layer network, and wherein the authentication management device is in communication with the switch and configured to dynamically update the internal database with MAC addresses of other computing devices allowed into the multi-layer network.

24. The apparatus of claim 23, further configured to:

assign the fifth hierarchical penetration level to the computing device and grant the computing device access to an isolated network access and control zone isolated from the rest of the multi-layer network except for other devices in the isolated network access and control zone, and thereby permit the computing device to communicate with:

other computing devices which have also been assigned to the fifth hierarchical penetration level;

a defined external endpoint that is external to the isolated network access and control zone;

infrastructure application services in the multi-layer network and outside the isolated network access and control zone; and at least one of the other computing devices or services on the multi-layer network.

\* \* \* \* \*